United States Patent Office 2,710,289
Patented June 7, 1955

2,710,289

ELASTIC ORGANOPOLYSILOXANES OF IMPROVED HEAT RESISTANCE

Robert Smith-Johannsen, Niskayuna, N. Y., assignor to General Electric Company, a corporation of New York No Drawing. Application April 28, 1953, Serial No. 351,732

14 Claims. (Cl. 260—37)

This invention is concerned with improving the heat resistance of silicone rubbers. More particularly, the invention relates to organopolysiloxanes convertible by heat to the solid, elastic state wherein the heat-converted products have improved heat resistance, the aforesaid improved composition comprising (1) a filled, preformed, organopolysiloxane, for example, a hydrocarbon-substituted polysiloxane, convertible to the solid, elastic state and (2) a minor proportion of a preformed mixture of ingredients consisting essentially of the following materials in the stipulated per cent, by weight, the total weight being equal to approximately 100 per cent:

| Ingredient: | Percent |
|---|---|
| $Al_2O_3$ | 25–29 |
| $Fe_2O_3$ | 11–18 |
| $SiO_2$ | 14–16 |
| $TiO_2$ | 7–11 |
| $CaO$ | 7–10 |
| $Na_2O$ | 7–10 |
| Loss of ignition (mostly water) | 11–17 |

One of the objects of this invention is to improve the heat resistance of silicone rubber so that it is able to withstand temperatures of about 250 to 315° C. for long periods of time.

A still further object of the invention is to improve the strength properties of the cured, solid, elastic organopolysiloxanes at elevated temperatures of 315° C. and over.

Other objects of this invention will become apparent from the description thereof which is given below.

All the foregoing objects can be obtained by incorporating in a heat-convertible organopolysiloxane small amounts of a mixture of metallic oxides in the percents previously described and using the ingredients more particularly itemized in the foregoing description.

The mixture of metallic oxides (for brevity hereinafter referred to as mixture of "metallic oxides") is obtained from bauxite in the manufacture of metallic aluminum. More particularly the bauxite is dissolved in suitable solvents whereby a substantial amount of aluminum oxide dissolves in the solvent and the insoluble residue, which has the appearance of red mud, is removed, washed, subjected to a flotation operation, dried and thereafter pulverized. It is found that this metallic oxide mixture (recovered from bauxite residue by elutriation) contains a relatively large amount of aluminum oxide which up to the present time has been difficult to remove from this so-called red mud. This mixture of metallic oxides is used in commerce for various applications requiring high temperature thermo-insulating properties and is manufactured by the Aluminum Company of America under the name "R–20— Commercial Alcoa Insulating Powder." Its density in powder form is of the order of about 50 pounds per cubic foot, and it is stable to the transition point of between 1900 and 2000° F. Generally the average particle size of this material is of the type which will pass through a 300 mesh screen. This mixture of metallic oxide is unexpectedly quite uniform in composition as evidenced by the fact that analysis of this particular red mud over a period of the last 17 years shows variations in the proportions of the ingredients of the order from about 2 to 3 percent from the average values. Thus, it has been found, for example, that present analysis of the mixture of metallic oxides runs about as follows:

| | Percent |
|---|---|
| $Al_2O_3$ | 26 |
| $Fe_2O_3$ | 17 |
| $SiO_2$ | 14 |
| $TiO_2$ | 11 |
| $CaO$ | 10 |
| $Na_2O$ | 10 |
| Loss on ignition | 12 |

17 years ago when another analysis was conducted on this metallic oxide mixture, it was found that the following was the result:

| | Percent |
|---|---|
| $Al_2O_3$ | 28.41 |
| $Fe_2O_3$ | 11.43 |
| $SiO_2$ | 15.86 |
| $TiO_2$ | 7.96 |
| $CaO$ | 7.92 |
| $Na_2O$ | 7.8 |
| Loss on ignition | 16.44 |
| Miscellaneous inorganic materials | 4.18 |

The item "loss on ignition" is for the most part almost entirely water which is combined with the particles of metallic oxide.

In the specification and in the claims, for brevity, the convertible organopolysiloxanes, which may be viscous masses or gummy solids, depending on the state of condensation, will hereinafter be referred to as "convertible organopolysiloxanes" or more specifically as "convertible methyl polysiloxanes." Although convertible organopolysiloxanes with which the present invention is concerned are now well known in the art, for the purpose of showing the various convertible organopolysiloxanes which may be employed in the practice of the present invention, attention is directed to the convertible organopolysiloxanes disclosed in Agens Patent 2,448,756 and Sprung et al. Patent 2,448,556 the latter two patents being issued September 7, 1948; Sprung Patent 2,484,595 issued October 11, 1949; Krieble et al. Patent 2,457,688 issued December 28, 1948; Marsdan Patent 2,521,528 issued September 5, 1950; all the foregoing patents being assigned to the same assignee as the present invention; Hyde Patent 2,490,357 issued December 5, 1949; and Warrick Patent 2,541,137 issued February 13, 1951.

It will, of course, be understood by those skilled in the art that other convertible organopolysiloxanes containing the same or different silicon-bonded organic, for instance, hydrocarbon, substituents (e. g., methyl, ethyl, propyl, phenyl, tolyl, xylyl, benzyl, phenylethyl, naphthyl, chlorophenyl, both methyl and phenyl, etc., radicals) connected to the silicon atoms by carbon-silicon linkages, may be employed without departing from the scope of this invention. The particular convertible organopolysiloxane used is not critical and may be any one of those described in the foregoing patents generally obtained by condensation of a liquid organopolysiloxane containing an average of from about 1.95, preferably from about 1.98 to about 2.05 organic groups per silicon atom. The condensing agents which may be employed are well known in the art and may include, for instance, ferric chloride hexahydrate, phenyl phosphoryl chloride; alkaline condensing agents, such as potassium hydroxide, sodium hydroxide, etc. Each convertible organopolysiloxane generally comprises polymeric diorganosiloxanes which may contain, if desired, for example, up to 2 mol per cent copolymerized mono-organosiloxane, for example copolymerized monomethylsiloxane. Generally, I prefer to use as the starting liquid organopolysiloxanes from which the convertible, for example, heat-convertible organopolysiloxanes are prepared, ones which contain about 1.999 to 2.01, inclusive, organic groups, for example, methyl groups per silicon atom, and where preferably more than 75 per cent of the silicon atoms in the polysiloxane contain two silicon-bonded lower alkyl groups.

The starting organopolysiloxanes used to make the convertible organopolysiloxanes advantageously comprise organic constitutents consisting essentially of monovalent organic radicals attached to silicon by carbon-silicon linkages, and in which essentially all the siloxane units consist of units of the structural formula $R_2SiO$ where R is preferably a radical of the group consisting of methyl and phenyl radicals. At least 90 per cent of the total number of R groups are preferably methyl radicals. The polysiloxane may be one in which all the siloxane units are $(CH_3)_2SiO$, or the siloxane may be a copolymer of dimethylsiloxane with a minor amount (e. g., from 1 to 20 or more mol per cent) of any of the following units, alone or in combination therewith: $C_6H_5(CH_3)SiO$ and $(C_6H_5)_2SiO$. The presence of halogen, e. g., chlorine, atoms on the phenyl nucleus is not precluded.

The amount of the mixture of metallic oxides which may be added to the convertible organopolysiloxane may be varied within fairly wide limits. Noticeable effects are apparent when amounts as small as 0.01%, by weight, of the mixture of metallic oxides are added, based on the weight of the convertible organopolysiloxane. Generally, I may advantageously employ from about 0.01 to about 8 percent, preferably from about 2 to 6 percent, by weight, of the mixture of metallic oxides, based upon the weight of above-mentioned convertible organopolysiloxane. Amounts in excess of 8% appear to give little, if any, additional improvement in the properties of the convertible organopolysiloxane.

No particular precaution need be taken in incorporating the mixture of the metallic oxides in the convertible organopolysiloxane. The incorporation of the additive may be done on the usual rubber compounding rolls at the same time that the filler and curing agent for the convertible organopolysiloxane are added. Improved results may be obtained if the mixture of metallic oxides is first mixed with the filler, particularly when the filler is silica aerogel, and the mixture thereafter added to the convertible organopolysiloxane. If this is done, it will be found that the heat-aging properties and retention of physical strength will be better than is the case when the filler, e. g., the silica aerogel, is added to the convertible organopolysiloxane, the mixture of metallic oxides incorporated thereafter.

Among the fillers which may be incorporated in the convertible organopolysiloxane may be mentioned, for instance, titanium dioxide, lithopone, zinc oxide, talc, zirconium silicate, silica aerogel, iron oxide, diatomaceous earth, calcium carbonate, fumed silicas, etc. The amount of filler used may obviously be varied within wide limits, for instance, from about 10 to about 300%, by weight, of the filler, based on the weight of the convertible organopolysiloxane. The exact amount of filler used will depend upon such factors as, for instance, the application for which the converted organopolysiloxane is intended, the type of filler employed (e. g., density of the filler) the type of convertible organopolysiloxane employed, etc.

Various curing agents (or vulcanizing agents) may be incorporated in the convertible organopolysiloxane for effecting more rapid and more complete curing of the latter. Among such curing agents may be mentioned, for instance, benzoyl peroxide, tertiary butyl perbenzoate, zirconyl nitrate, boron hydrides, etc. Generally, these curing agents are present in amounts ranging from about 0.1 to as high as 6 to 8%, or more preferably from about 1 to 4%, by weight, based on the weight of the organopolysiloxane.

After incorporation of the mixture of metallic oxides, curing agent, filler, and any other modifying agents, for instance, dyes, pigments, etc., often used with heat-convertible organopolysiloxanes, the latter is advantageously heated to effect curing at temperatures ranging from about 100° to 150° C. for varying lengths of time, for instance, of the order of from about 5 to 30 minutes or more. If pressure is employed, it is generally desirable to employ pressures ranging from about 10 to 1000 p. s. i. or more. The sample is preferably given a further heat cure at elevated temperatures, for example, at 150° C. followed by a higher temperature, for example, for about 24 hours at 250° C. to insure complete cure and attainment of optimum properties particularly strength properties.

In order that those skilled in the art may better understand how the present invention may be practiced, the following examples are given by way of illustration and not by way of limitation. All parts are by weight. In the following examples, the heat-curable organopolysiloxane used was obtained by hydrolyzing essentially pure dimethyldichlorosilane, isolating the liquid polymer obtained as the result of this hydrolysis, and condensing the mixture of liquid polydimethylsiloxanes with a condensing agent comprising about 0.01%, by weight, thereof KOH until a highly viscous mass bordering on a gummy solvent was obtained. The polydimethylsiloxane thus obtained had slight flow at room temperature and was soluble in benzene. This material had a ratio of approximately two methyl groups per silicon atom.

EXAMPLE 1

In this example 100 parts of the above-described heat-convertible methylpolysiloxane was intimately mixed with 40 parts silica aerogel (Santocel C manufactured by Monsanto Chemical Company) and 1.65 parts benzoyl peroxide. To 75 parts of this filled polydimethylsiloxane containing the benzoyl peroxide curing agent was added 2.5 parts of the above described mixture of metallic oxides which in this case analyzed as follows:

| | Percent |
|---|---|
| $Al_2O_3$ | 26 |
| $Fe_2O_3$ | 17 |
| $SiO_2$ | 14 |
| $TiO_2$ | 11 |
| $CaO$ | 10 |
| $Na_2O$ | 10 |
| Loss on ignition | 12 |

As controls and to establish that the use of certain individual metallic oxides did not have the same effect as the mixture of metallic oxide described above, sample formulations were also prepared in which pure $Al_2O_3$ and $Fe_2O_3$ were added respectively in the same amount, by weight, to the formulation of the polydimethylsiloxane, silica aerogel, and benzoyl peroxide, more particularly described above. Each of the samples was pressed in a mold in the form of a flat sheet for about 15 minutes at a temperature of 150° C. under a pressure of about 500 p. s. i., and thereafter further heat-aged in an air circulating oven for 24 hours at 250° C. The samples were then further heated in the same air circulating oven for 24 hours at 315° C. and the samples thereafter examined. It was found that the control sample which had no metallic oxide additive (exclusive of course of the silica aerogel filler) had completely disintegrated, while the remaining samples were well preserved as far as visible deterioration, shrinkage or weight loss were concerned. However, after an additional 18 hours at 315° C. the sample containing the $Al_2O_3$ broke when bent at a 180° bend, while the samples containing the iron oxide and the mixture of metallic oxide were still soft and had good elongation. However, after a total of 92 hours at 315° C., the sample containing the $Fe_2O_3$ additive became very brittle and broke, while the sample containing the mixture of metallic oxides was still soft and could be bent around a 180° bend without breaking.

EXAMPLE 2

In this example the same polydimethylsiloxane described above was intimately mixed in the same manner (with the exception of Sample No. G) as more particularly recited in Example 1 with varying amounts of silica aerogel filler and mixture of metallic oxides, while at the same time varying the amount of benzoyl peroxide used as curing agent. Each of the samples was molded and heat-aged for 24 hours in the same manner as is described in Example 1 and thereafter subjected to further heat-aging at 315° C. for 24 hours. The following Table I shows the ingredients employed in each case together with the proportions of these ingredients. Table II shows the property of the various samples after the 315° C. heat-aging tests.

Table I

| Ingredient | Parts in Each Sample—Sample No. | | | | | | |
|---|---|---|---|---|---|---|---|
|  | A | B | C | D | E* | F | G |
| Polydimethylsiloxane | 100 | 100 | 100 | 100 | 100 | 100 | 100 |
| Silica Aerogel (Santocel C) | 40 | 40 | 40 | 40 | 25 | 33 | 33 |
| Benzoyl peroxide | 1.65 | 1.65 | 1.65 | 1.65 | 1.65 | 1.65 | 1.65 |
| Mixture of Metallic Oxides | 0 | 1 | 2 | 5 | 5 | 2 | 0 |

\* In contrast to the other samples in which the mixture of metallic oxides was added after all the other ingredients had been compounded, in Sample No. E the silica aerogel was first mixed with the mixture of metallic oxides and thereafter added on the rolls to the mixture of the polydimethylsiloxane and benzoyl peroxide.

Table II

PROPERTIES

| Sample No. | Tensile, p. s. i. | Percent Elongation | Tear, p./i. |
|---|---|---|---|
| A | (¹) | (¹) | (¹) |
| B | 637 | 87 | 47 |
| C | 695 | 140 | 73 |
| D | 592 | 110 | 68 |
| E | 575 | 230 | 43 |
| F | 757 | 82 | 34 |
| G | (²) | (²) | (²) |

¹ Complete disintegration.
² Disintegrated.

From an examination of the results described for Sample No. E, it will be evident that additional improvement in the heat resistance of the converted organopolysiloxane in the form of improved flexibility (as evidence of the marked retention of elongation) may be realized by incorporating the mixture of metallic oxides in the filler before the latter is added to the convertible organopolysiloxane and curing agent. This, of course, does not mean that marked improvements in heat-aging are not obtained by adding the mixture of metallic oxides to the previously compounded mixture of the convertible organopolysiloxane and filler, as is more particularly illustrated in the other samples appearing in Tables I and II.

It will, of course, by understood by those skilled in the art that various other mixtures of the metallic oxides may be employed in the practice of this invention within the scope of the ranges for the various ingredients in the mixture described initially. Obviously, other concentrations of the mixture of metallic oxide may also be employed without departing from the scope of the invention. Other fillers, many examples of which have been given previously, as well as other types of convertible organopolysiloxanes may be employed in the practice of the present invention.

Instead of using a polymeric diorganosiloxane as, for example, polymeric dimethylsiloxane containing about two organic groups, for example, methyl groups, per silicon atom, convertible organopolysiloxanes containing up to at most 1.0 mol percent copolymerized monoorganosiloxane, for example, copolymerized monomethylsiloxane, or up to 0.02 mol percent copolymerized triorganosiloxane, e. g., trimethylsiloxane, may also be used in the present invention. Generally, I prefer that the organopolysiloxane from which the heat-curable or heat convertible organopolysiloxane is prepared contains about 1.98 to 2.02 inclusive, especially two organic groups, for example, methyl groups, methyl and phenyl groups, etc., per silicon atom, and more than 98%, for example 99.8% of the silicon atom of the polysiloxane containing two silicon-bonded organic groups, for instance, alkyl groups or mixtures of alkyl and aryl groups, for example, methyl groups, methyl and aryl groups, etc.

In addition to making molding compositions herein described, the convertible organopolysiloxanes containing the mixture of metallic oxides as well as various fillers and curing agents, may also be dissolved or dispersed in various solvents, for instance, toluene, xylene, etc., to make coating compositions which are applicable for use as coating and impregnating agents. The convertible and heat-converted organopolysiloxanes herein described are useful for coating and impregnating various glass fibrous surfaces, for example, glass tape, glass fiber, glass fiber sheets, etc. In the latter instance, glass cloth can be coated with convertible organopolysiloxane containing filler, curing agent, and the particular mixture of metallic oxides herein described and thereafter the coated glass cloth can be wrapped around mandrels to make heater ducts and cured under heat to give unitary structures having outstanding heat resistance. In addition, electrical conductors, for example, copper conductors can now be readily insulated e. g., by extrusion, with the convertible organopolysiloxanes herein described and the total assembly cured to give a unitary structure having good electrical properties and outstanding heat resistance. The products herein described can also be used to make gaskets having outstanding resistance to elevated temperatures and can be used in applications, for instance, in jet engine parts for sealing purposes where excessively high temperatures are encountered in connection with the operation of such engines.

What I claim as new and desire to secure by Letters Patent of the United States is:

1. A composition of matter comprising (1) a silica-filled organopolysiloxane convertible by heat to the cured, solid, elastic state consisting essentially of monovalent hydrocarbon radicals and silicon and oxygen atoms, in which the hydrocarbon radicals are selected from the class consisting of methyl, ethyl, phenyl, and chlorophenyl radicals, and are attached to silicon by carbon-silicon linkages, and (2) a preformed mixture of metallic oxides other than the above-mentioned silica filler present, by weight, in an amount equal to at most 10 percent of the weight of the aforesaid organopolysiloxane, the aforesaid mixture of metallic oxides having the following ingredients in the stipulated percents, by weight:

Ingredient: Percent
$Al_2O_3$ _____ 25–29
$Fe_2O_3$ _____ 11–18
$SiO_2$ _____ 14–16
$TiO_3$ _____ 7–11
$CaO$ _____ 7–10
$Na_2O$ _____ 7–10
Loss on ignition_____ 11–17

2. A composition of matter comprising (1) a silica filled methylpolysiloxane convertible by heat in the presence of a curing agent to the solid, elastic state consisting essentially of methyl radicals and silicon and oxygen atoms, in which the methyl radicals are attached to silicon by carbon-silicon linkages, and (2) from 0.1 to 10 percent, by weight, based on the weight of the aforesaid methylpolysiloxane, of a preformed mixture of metallic oxides other than the above-mentioned silica filler having the following ingredients in the stipulated percents, by weight:

| Ingredient: | Percent |
|---|---|
| $Al_2O_3$ | 25–29 |
| $Fe_2O_3$ | 11–18 |
| $SiO_2$ | 14–16 |
| $TiO_2$ | 7–11 |
| CaO | 7–10 |
| $Na_2$ | 7–10 |
| Loss on ignition | 11–17 |

3. The heat converted product of claim 1.
4. The heat converted product of claim 2.
5. A composition of matter as in claim 2 in which the filler is silica aerogel.
6. A composition of matter comprising (1) a silica-filled methylpolysiloxane convertible by heat to the cured, solid, elastic state and containing an average of from about 1.98 to 2.02 methyl groups per silicon atom, the aforesaid methyl groups being attached to the silicon atoms by carbon-silicon linkages, and (2) from 2 to 5 percent, by weight, based on the weight of the aforesaid methylpolysiloxane of a preformed mixture of metallic oxides other than the abovementioned silica and comprising the following ingredients in the stipulated percents, by weight:

| Ingredient: | Percent |
|---|---|
| $Al_2O_3$ | 26 |
| $Fe_2O_3$ | 17 |
| $SiO_2$ | 14 |
| $TiO_2$ | 11 |
| CaO | 10 |
| $Na_2O$ | 10 |
| Loss on ignition | 12 |

7. A composition of matter comprising (1) a methylpolysiloxane convertible by heat to the cured, solid, elastic state in which there are present an average of from about 1.98 to 2.02 silicon-bonded methyl groups per silicon atom, (2) a filler comprising silica aerogel, (3) a small amount of benzoyl peroxide as a curing agent, and (4) from 2 to 5 percent, by weight, based on the weight of the aforesaid methylpolysiloxane of a preformed mixture of metallic oxides comprising the following ingredients in the stipulated percents, by weight:

| Ingredient: | Percent |
|---|---|
| $Al_2O_3$ | 26 |
| $Fe_2O_3$ | 17 |
| $SiO_2$ | 14 |
| $TiO_2$ | 11 |
| CaO | 10 |
| $Na_2O$ | 10 |
| Loss on ignition | 12 |

8. The heat treated product of claim 7.
9. A composition of matter comprising (1) a methyl phenylpolysiloxane containing an average of from about 1.98 to 2.02 total methyl and phenyl groups per silicon atom, the aforesaid methyl and phenyl groups being attached to the silicon atoms by carbon-silicon linkages, (2) a filler comprising silica aerogel, (3) a small amount of a curing agent for (1) comprising benzoyl peroxide, and (4) a preformed mixture of metallic oxides comprising the following ingredients in the stipulated percents, by weight:

| Ingredient: | Percent |
|---|---|
| $Al_2O_3$ | 26 |
| $Fe_2O_3$ | 17 |
| $SiO_2$ | 14 |
| $TiO_2$ | 11 |
| CaO | 10 |
| $Na_2O$ | 10 |
| Loss on ignition | 12 |

10. The heat treated product of claim 9.
11. The method for improving the heat resistance of a silica-filled organopolysiloxane convertible by heat to the cured, solid, elastic state, the organic groups of the aforesaid organopolysiloxane being selected from the class consisting of methyl, ethyl, phenyl, and chlorophenyl radicals attached to silicon by carbon-silicon linkages, which method comprises incorporating in the aforesaid organopolysiloxane from 0.1 to 10 per cent, by weight, based on the weight of the organopolysiloxane, of a preformed mixture of metallic oxides other than the above-mentioned silica filler comprising the following ingredients in the stipulated percents, by weight:

| Ingredient: | Percent |
|---|---|
| $Al_2O_3$ | 25–29 |
| $Fe_2O_3$ | 11–18 |
| $SiO_2$ | 14–16 |
| $TiO_2$ | 7–11 |
| CaO | 7–10 |
| $Na_2O$ | 7–10 |
| Loss on ignition | 11–17 | and thereafter heating the mixture of ingredients at an elevated temperature in order to effect conversion of the latter to the cured, solid, elastic state.

12. The method which comprises incorporating in a methylpolysiloxane containing an average of from about 1.98 to 2.02 silicon-bonded methyl groups per silicon atom, from 0.1 to 10 percent, by weight, based on the weight of the methylpolysiloxane, of a preformed mixture of metallic oxides comprising the following ingredients in the stipulated percents, by weight:

| Ingredient: | Percent |
|---|---|
| $Al_2O_3$ | 26 |
| $Fe_2O_3$ | 17 |
| $SiO_2$ | 14 |
| $TiO_2$ | 11 |
| CaO | 10 |
| $Na_2O$ | 10 |
| Loss on ignition | 12 | together with a filler comprising silica aerogel and a curing agent comprising benzoyl peroxide, and thereafter heating the mixture of ingredients at an elevated temperature in order to effect conversion of the later to the cured, solid, elastic state.

13. The method for improving the heat resistance of a silica-filled organopolysiloxane convertible by heat to the cured, solid, elastic state, the organic groups of the aforesaid organopolysiloxane being selected from the class consisting of methyl, ethyl, phenyl, and chlorophenyl radicals attached to silicon by carbon-silicon linkages, which process comprises adding to a mixture of ingredients comprising the aforesaid organopolysiloxane, an intimate mixture containing a filler for the aforesaid organopolysiloxane and from 0.1 to 10 percent, by weight, based on the weight of the organopolysiloxane, of a preformed mixture of metallic oxides other than the aforesaid silica filler comprising the following ingredients in the stipulated percents, by weight:

| Ingredient: | Percent |
|---|---|
| $Al_2O_3$ | 25–29 |
| $Fe_2O_3$ | 11–18 |
| $SiO_2$ | 14–16 |
| $TiO_2$ | 7–11 |
| $CaO$ | 7–10 |
| $Na_2O$ | 7–10 |
| Loss on ignition | 11–17 | and thereafter heating the entire mixture of ingredients at an elevated temperature in order to effect conversion of the latter to the cured, solid, elastic state.

14. The method which comprises incorporating in a methylpolysiloxane containing an average of from about 1.98 to 2.02 silicon-bonded methyl groups per silicon atom and containing benzoyl peroxide as a curing agent, an intimate mixture of silica aerogel and from 0.1 to 10 percent, by weight, based on the weight of the methylpolysiloxane, of a preformed mixture of metallic oxides comprising the following ingredients in the stipulated percents, by weight:

| Ingredient: | Percent |
|---|---|
| $Al_2O_3$ | 26 |
| $Fe_2O_3$ | 17 |
| $SiO_2$ | 14 |
| $TiO_2$ | 11 |
| $CaO$ | 10 |
| $Na_2O$ | 10 |
| Loss on ignition | 12 | and thereafter heating the mixture of ingredients at an elevated temperature in order to effect conversion of the latter to the cured, solid, elastic state.

References Cited in the file of this patent

UNITED STATES PATENTS 2,563,555    Safford ---------------- Aug. 7, 1951